United States Patent [19]

Baumgartner et al.

[11] 4,033,780

[45] July 5, 1977

[54] METHOD OF ENHANCING THE REFRACTORINESS OF HIGH PURITY FUSED SILICA

[75] Inventors: Charles E. Baumgartner; Peter P. Bihuniak, both of Corning, N.Y.

[73] Assignee: Corning Glass Works, Corning, N.Y.

[22] Filed: Apr. 26, 1976

[21] Appl. No.: 680,459

[52] U.S. Cl. .................................. 106/69; 106/73.5
[51] Int. Cl.² ........................................ C04B 35/14
[58] Field of Search ................. 106/52, 69, 73.5; 423/335, 338, 339

[56] References Cited

UNITED STATES PATENTS 3,370,921 2/1968 Wagstaff .............................. 106/69

Primary Examiner—J. Poer
Attorney, Agent, or Firm—Milton M. Peterson; Clinton S. Janes, Jr.; Clarence R. Patty, Jr.

[57] ABSTRACT

A method is disclosed wherein high purity fused silica is produced from a liquid flowable form of a silica slurry or sol and the refractoriness of the fused silica is enhanced by homogeneously doping the silica with elemental silicon.

6 Claims, No Drawings

METHOD OF ENHANCING THE REFRACTORINESS OF HIGH PURITY FUSED SILICA

BACKGROUND OF THE INVENTION

This invention relates to a method of producing fused silica of very high purity, and more particularly to a method of increasing the refractoriness of the silica without sacrificing purity, this method involving dispersing elemental silicon in a liquid flowable form of a silica slurry or sol from which the fused silica is prepared.

High purity fused silica can be produced from a number of different materials, and by various different procedures. A commercially used process involves vapor phase oxidation of silicon tetrachloride ($SiCl_4$) to silica. This process is generally described for example in U.S. Pat. No. 2,272,342 granted Feb. 10,, 1942 to J. F. Hyde. Various other halides, silanes, and other volatile silicon compounds may be employed in lieu of the chloride. Alternatively, combustion processes, such as are described in U.S. Pat. No. 2,823,982, granted Feb. 18, 1958 to O. Saladin et al., and No. 3,698,936, granted Oct. 17, 1972 to H. J. Moltzan, may be employed. Also, hydrolytic processes starting with organic silicates are well known. The main factor in achieving a high purity level with any of these processes is the purity of the particular starting material selected.

The purity factor is very important in certain products such as the silica crucibles used in melting and drawing elemental silicon for semiconductor use. For such purposes, alkali metal ion impurity must be below 10 ppm, and the transition metals must be below one ppm.

In addition to a high purity level, fused silica is frequently required to have a relatively high refractoriness or heat resistance. This characteristic is commonly identified with reference to the viscosity-temperature relationship of the ultimate vitrified silica. Glass annealing and strain points are the commonly recognized and readily measured indicia of refractoriness or heat resistance.

PRIOR ART

Various techniques and materials for producing high purity fused silica have already been acknowledged.

It is also known that the addition of certain dopants will increase the viscosity of fused silica as indicated by an increase in the glass strain and annealing points. Thus, U.S. Pat. No. 3,848,152 granted Nov. 12, 1974 to P. C. Schultz, discloses adding 100 to 10,000 ppm on the cation mole basis (0.01–1.0 cation mole percent) of a dopant oxide for this purpose. However, these dopants in such amounts would be regarded as unacceptable impurity levels for many purposes and hence could not be used. Furthermore, they may increase devitrification tendencies in fused silica.

U.S. Pat. No. 3,370,921, granted Feb. 27, 1968 to F. E. Wagstaff, describes a method of enhancing the devitrification resistance of fused silica which consists in adding one hundred ppm (equivalent to 0.01% by weight) of elemental silicon to dried, powdered fused silica to produce, on firing, an oxygen deficient material that has an enhanced resistance to devitrification. No mention is made regarding the effect of such addition on any other properties of the material.

U.S. Pat. No. 3,713,854, granted Jan. 30, 1973 to G. H. Beall, describes and claims a glass-ceramic article made by crystallization in situ from a silicate glass body containing, as a nucleating agent, an amount of reduced silica equivalent to about 0.15–2% by weight elemental silicon.

RELATED APPLICATION

Ser. Nos. 680,451 and 680,460, filed of even date herewith by P. P. Bihuniak and D. L. Guile, and each also entitled "Method of Enhancing the Refractoriness of High Purity Fused Silica," disclose and claim the use of selected metal oxides, in some cases in conjunction with elemental silicon, as dopants to increase the refractoriness of fused silica.

Ser. No. 680,061, also filed of even date herewith by P. P. Bihuniak, L. H. Brandes, and D. L. Guile, and entitled "Method of Densifying Metal Oxides," discloses and claims a method of densifying fumed silica and of producing fused silica articles therefrom.

SUMMARY OF THE INVENTION

It is a primary purpose of the invention to provide a method of enhancing the refractoriness of fused silica. A more specific purpose is to enhance the refractoriness of high purity fused silica without adversely affecting the impurity level. Another purpose is to provide a high purity fused silica having an enhanced refractoriness.

To these and other ends, our invention is a method of enhancing the refractoriness of high purity fused silica which comprises doping a liquid flowable form of silica slurry or sol with elemental silicon in an amount from 200 to 2500 ppm by weight, as based on the fused silica, and producing the fused silica from the silicon-doped silica. The silicon-doped silica is dried to produce silica fragments which may be calcined and milled to prepare a casting slip, or may be directly vitrified.

Any of the known sources of high purity silica may serve as a starting material for present purposes. These include, for example, hydrolyzed organosilicates (in particular materials commercially known as ethyl silicates), hydrolyzed silicon tetrachloride, and an aqueous sol of fumed silica. The critical requirements are that the starting material have a requisite degree of purity, and be in, or be capable of conversion to, a liquid flowable form such as a silica sol or colloidal suspension. The silica must be in such flowable form to facilitate dispersion of the silicon therein. It may take a gel form during or subsequent to dispersion of the silica, but not before.

Finely divided, elemental silicon is then thoroughly dispersed in the flowable silica, preferably with the aid of a mechanical mixer, to provide homogeneous doping and, ultimately, increased refractoriness. At least 200 ppm are necessary to obtain a substantial influence on refractoriness. Increasing amounts tend to impart color to the fused silica and also to produce seeds that diminish glass quality. Up to 2500 ppm silicon may be added without such adverse effects becoming serious. However, little advantage appears to be obtained above 1500 ppm and we prefer to use silicon additions below this level. While particle size is not critical, improved homogeneity is generally obtained with finer subdivision. Thus, while we have used elemental silicon up to 75 microns in size, we prefer that it be less than 40 microns.

The silica, homogeneously doped with the dispersed silicon particles, may then be dried to produce silica fragments or chunks. These fragments are then heat treated to prepare the silica for further processing. This heating step also causes the silicon to react and thereby effect the desired increase in refractoriness as discussed subsequently. The silica fragments may be heated directly to melting temperatures if direct article forming, such as fiber formation, is desired. Alternatively, the fragments may be calcined in the temperature range of 1000° C. to 1500° C. preparatory to milling to a particle size suitable for slip casting.

The conditions for the drying and heating procedure are not critical, but we prefer those described in a companion application Ser. No. 680,061, filed of even date herewith by P. P. Bihuniak et al. and entitled, "Method of Densifying Metal Oxides." Briefly, that procedure comprises delivering the doped dilica in a stream or layer customarily about ½ to ¼ inch in thickness and drying such stream to a rigid state. On further drying the rigid material dices up into small particles, the size being generally dependent on thickness of the layer. When calcined at 1000° C. to 1500° C., these particles are of optimum size for wet milling with a casting medium to provide a slip for casting articles such as crucibles.

When silica sols, undoped with any additive, are dried and ultimately converted into fused silica glass bodies, the glasses are found to have annealing points in a range from about 1000° C. to somewhat above 1100° C., depending on the raw material source, the previous firing conditions, and other factors. Correspondingly, the strain points vary from about 900° C. to 1000° C. or somewhat higher.

We have found that these indicia of viscosity can be raised a substantial amount when silicon is present in accordance with the invention. While some effect on refractoriness may be obtained by adding the silicon at any stage in processing, for example, during ball milling of the calcined silica, the optimum effect is achieved by dispersing the silicon, in finely divided form, in the liquid flowable silica before drying. This also minimizes bubbles and other physical inhomogeneities in the ultimate vitrified silica.

We have also found that the viscosity characteristics of a fused silica, as indicated by the strain point, appear to be related to the residual water content of a glass, also referred to as hydroxyl ion content. This is measured as the —OH stretching vibrational absorption of infrared energy. Such absorption coefficients are known and reported as $B_{OH}$ values.

Table 1 below sets forth annealing point, strain point and $B_{OH}$ data measured on eight different fused silica glass samples prepared in essentially identical manner, the variables being the silica source and the presence or absence of silicon.

TABLE I

| Material | Ann. Pt. | Str. Pt. | $B_{OH}$ |
|---|---|---|---|
| Condensed ethyl silicate | 1079° C. | 965° C. | .133 |
| plus 500 ppm Si | 1118° C. | 1014° C. | .003 |
| Ethyl silicate 40 | 1115° C. | 1000° C. | .073 |
| plus 500 ppm Si | 1128° C. | 1024° C. | .000 |
| SiCl₄ | 1015° C. | 905° C. | .2 |
| plus 650 ppm Si | 1138° C. | 1030° C. | |
| Fumed silica | 1002° C. | 899° C. | .265 |
| plus 500 ppm Si | 1130° C. | 1028° C. | .000 |

The exact mechanism whereby elemental silicon alters fused silica viscosity characteristics is not precisely understood. However, we believed that the silicon dopant reacts with structurally bound hydroxyl ions, liberating $H_2$ and tying up the otherwise weakened structure, thereby increasing the activation energy for viscous flow. This reaction may be shown qualitatively by:

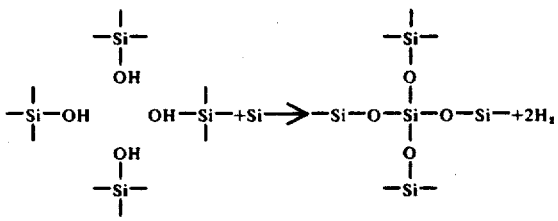

SPECIFIC EMBODIMENTS

EXAMPLE 1

One liter of an ethyl silicate known commercially as "condensed ethyl silicate" was mixed with 1 liter of water and with 575 ppm of finely divided silicon, followed by agitation for about ½ hour to obtain thorough dispersion and hydrolysis. The mixture was then heated at 65° C. for another half hour to polymerize this hydrated ethyl silicate. The doped silica gel thus produced was dried at 120° C. for 8 hours. This formed broken chunks of solid silica which were calcined at 1100° C. for about 8 hours in air, and then wet ball milled to provide an average particle size of 1 to 10 microns suitable for slip casting. The casting slip was poured into a mold and allowed to set to form a green body which was then vitrified in an argon atmosphere at 1800° C. for 10 minutes.

A similar fused silica body was produced in like manner, except that the silicon addition was omitted. Measurements of infrared absorption coefficient ($B_{OH}$), percent water content, and annealing and strain points (in degrees Centigrade) were then made on the two glasses. The measured data are set forth in the following table:

TABLE II

| Silica | $B_{OH}$ | %H₂O (wt.) | Ann. Pt. | Str. Pt. |
|---|---|---|---|---|
| Undoped | .072 | .007 | 1052 | 946 |
| Si doped | .002 | .0002 | 1113 | 1004 |

EXAMPLE 2

One liter of silicon tetrachloride was added to a liter of water, the addition being very slowly and with continuous stirring because of the vigorous exothermic reaction. A 1200 ppm addition of finely divided silicon was made to the hydrolyzed product with mixing to thoroughly disperse the particles. The doped hydrolysis product was then dried, calcined, wet milled, slipcast and vitrified as in Example 1.

Again an undoped comparison fused silica sample was processed. Annealing and strain points were measured on each sample as before. The absorption coefficient ($B_{OH}$) was measured for the doped sample and estimated for the undoped sample. The data obtained are set forth in Table III below:

TABLE III

| Sample | $B_{OH}$ | Wt.% $H_2O$ | Ann. Pt. | Str. Pt. |
|---|---|---|---|---|
| Undoped | ~0.20 | ~0.02 | 1015 | 905 |
| Si doped | 0.014 | 0.0014 | 1138 | 1030 |

EXAMPLE 3

A series of silica sols was prepared by mixing, in a paddle type food mixer, fumed silica and water in a weight ratio of about 3:7, that is, about 30% by weight fumed silica in the resulting silica sol. The fumed silica was a commercial product characterized by a surface area of about 200 m²/gram and a density of 4 lbs./cu. ft.

Two lots were left undoped, while three had elemental silicon dispersed in the sol as a dopant. In one lot, silicon of −200 mesh size (74 microns) was added to provide 500 ppm on the total solids basis; in another, the same amount was added, but a more finely divided silicon (−325 mesh; 44 microns) was used; and 200 ppm of the −325 mesh silicon was added in a third lot.

The several sol lots were each processed by pouring out on a flat surface, drying over a heated plate to rigidify and fragment the material, and then calcining the fragments at about 1300° C. The calcined material was then wet milled and slipcast as described above. However, one of the previously undoped lots was provided with a mill addition of 500 ppm of −200 mesh silicon to compare the effectiveness of such mill addition with an earlier addition in the sol.

In each case, a cast body was vitrified in a dry air atmosphere in an electrically heated furnace and a second body was vitrified in a gas fired furnace. Annealing points were measured on each glass as an indication of viscosity. The data obtained follows:

TABLE IV

| Sample | Ann. Pt. (° C.) | |
|---|---|---|
| | Electric Fired | Gas Fired |
| Undoped | 1107 | 1107 |
| Mill Add. | 1125 | 1111 |
| Sol Add. (−325 mesh) | | |
| 200 ppm | — | 1108 |
| 500 ppm | 1141 | 1126 |
| Sol Acc. (−200 mesh) | | |
| 500 ppm | 1132 | 1112 |

It was observed that the annealing and strain points of an undoped silica could vary over about a hundred degree range depending on the raw materials, processing conditions, and other factors. The batches of this example were processed in a manner which minimizes retained water (hydroxyl ion) content, and hence demonstrate substantially higher annealing points than prior examples. However, the conditions were substantially constant, thus rendering the comparisons valid. It might be noted, however, that whereas a 200 ppm addition is relatively ineffective in this "dry" process, such amount would produce an appreciable effect in a "wet" process where $B_{OH}$ values would range higher for otherwise identical samples.

EXAMPLE 4

An aqueous suspension of the fumed silica of Example 3 was prepared containing 15% solids (silica) and divided into several samples. Each of these was doped to a different degree with finely divided silicon and carefully mixed to obtain thorough dispersion. The samples were then dried in bulk at 125° C. in air for 48 hours. The chunks thus obtained were calcined in air for 1 hour at 1250° C. The calcined silica was then ball milled to form a casting slip, and cast fused silica bodies produced in conventional manner.

For each sample, the annealing and softening points were measured in degrees Centigrade as well as the absorption coefficient ($B_{OH}$). These data, together with the identifying amount of dopant silicon (in ppm), are set forth in Table V below:

TABLE V

| Si (ppm) | Strain Pt. (° C) | Ann. Pt. (° C) | $B_{OH}$ |
|---|---|---|---|
| None | 899 | 1002 | 0.265 |
| 427 | 1014 | 1113 | 0.007 |
| 554 | 1038 | 1133 | 0.009 |
| 773 | 1010 | 1127 | 0.009 |
| 1675 | 1028 | 1125 | 0.005 |
| 2061 | 1028 | 1135 | 0.007 |

We claim:

1. In a method of producing a high purity fused silica product, wherein a liquid containing silica is dried to form solid silica bodies which are then thermally vitrified, the improvement, whereby the refractoriness of the fused silica is enhanced, which comprises doping a liquid flowable form of silica slurry or sol with 200 to 2500 parts per million by weight, as based on the fused silica, of elemental silicon.

2. A method of producing a high purity fused silica product which comprises the steps of doping a liquid flowable form of silica slurry or sol with 200 to 2500 ppm by weight, as based on the fused silica, of elemental silicon, drying the silicon doped source of silica to rigid silica fragments containing dispersed silicon, calcining the silica fragments at about 1000°–1500° C., and then firing said silica fragments to a fused silica product.

3. A method in accordance with claim 2 wherein the calcined product is milled to form a slip which is cast in a mold and the product thus formed is fired to a fused silica body of corresponding shape.

4. A method in accordance with claim 2 wherein the amount of silicon dopant present is less than 1500 ppm.

5. A method of enhancing the refractoriness of a fused silica product which comprises doping a liquid flowable form of silica slurry or sol with 200 to 2500 ppm by weight, as based on the fused silica, of elemental silicon, drying the silicon doped source of silica to form solid silica bodies, and firing said silica bodies to a fused silica product.

6. A method in accordance with claim 4 wherein the silicon dopant is present in an amount less than 1500 ppm.

* * * * *